May 7, 1968  H. SCHITTKO ET AL  3,382,432
CIRCUIT ARRANGEMENT FOR GENERATING A FREQUENCY
MARKER IN A MEASURING DEVICE WHICH PROVIDES
A REPRESENTATION OF A FREQUENCY CURVE
Filed Aug. 12, 1964
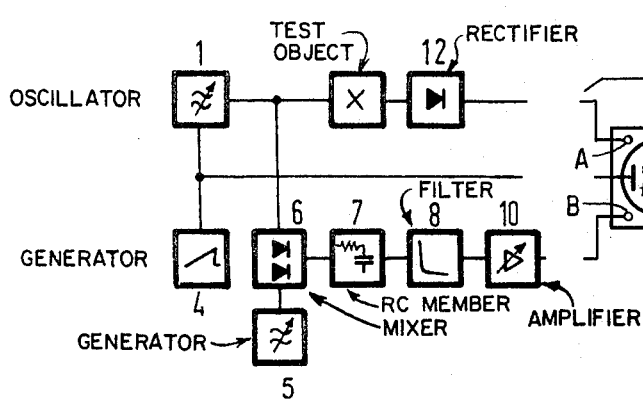
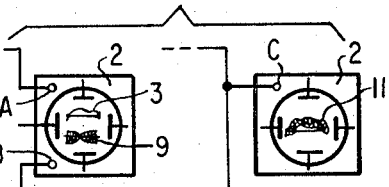
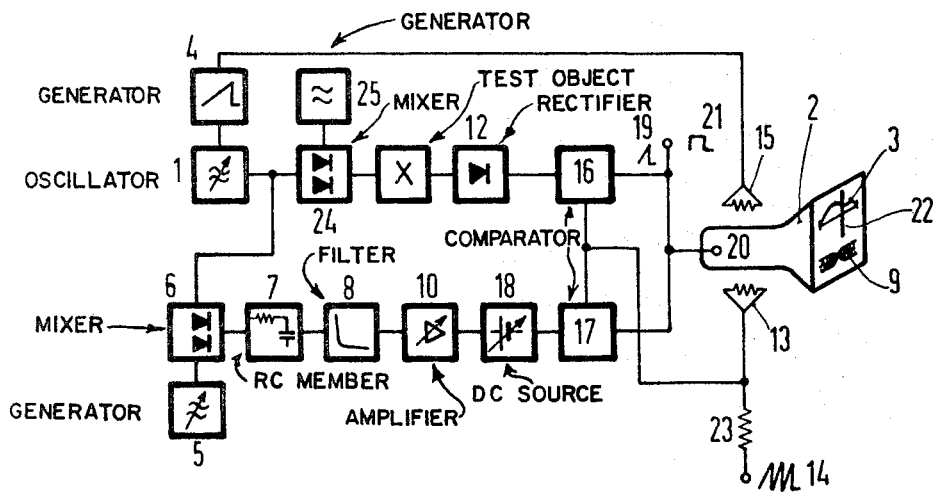

3,382,432
CIRCUIT ARRANGEMENT FOR GENERATING A FREQUENCY MARKER IN A MEASURING DEVICE WHICH PROVIDES A REPRESENTATION OF A FREQUENCY CURVE
Hans Schittko, Karl Bauernfeind, and Horst Thiess, Munich, Germany, assignors to Siemens Aktiengesellschaft, a corporation of Germany
Filed Aug. 12, 1964, Ser. No. 389,043
6 Claims. (Cl. 324—57)

ABSTRACT OF THE DISCLOSURE

A circuit arrangement for generating a frequency marker in a frequency response testing system employing a measuring device and a display device in the form of a cathode ray oscilloscope. A measuring voltage having a variable and, in particular, wobbulated frequency is mixed with an adjustable reference frequency, the difference frequency being applied to the input of a selective network, the output voltage of which is used to form frequency markers. There are means provided for displaying a representation of the output voltage of the selective network versus time simultaneously with a representation of the measuring voltage versus time over a common time base on the screen of the cathode ray oscilloscope. The output voltage representation constituting by an incision in the amplitude envelope thereof, a frequency marker which is applicable to the representation of the measuring voltage. A scale for the adjustment of the reference frequency can preferably be read to the values of the frequencies to be marked.

BACKGROUND OF THE INVENTION

Field of the invention

This invention relates to a frequency response testing system employing a display device and more particularly to a circuit arrangement for producing adjustable frequency markers connected with such a system.

Description of the prior art

The known testing systems of the above mentioned kind employing a cathode ray oscilloscope for a display device are adapted for evaluating a measuring voltage, the frequency of which is continuously variable and, in particular, wobbulated within a certain frequency range. Adjustable frequency markers to be blended into the frequency response representation provided by the display device are generally generated in a circuit arrangement by mixing the variable frequency of the measuring voltage with an adjustable reference frequency, the differential frequency being filtered out and applied to a selective network, the output of which serves to produce the frequency markers.

The selective network consists, in the known circuit arrangements, of a low pass filter with a relatively low cutoff frequency or of a band pass filter with a relatively narrow pass range. If in the case of the low pass filter the value of the variable frequency is approximately equal to the value of the fixed reference frequency, or, if in the case of the band pass filter, it differs from the value of the reference frequency by a fixed amount determined by the position of the pass range along the frequency axis, then there arise at the output side of the selective network in each case voltages which can be used to produce the frequency markers. Thus, for example, it is possible to use these voltages, preferably after rectification, for the additional deflection of the electron beam of the cathode ray oscilloscope or to bring about the release of an impulse by means of an impulse generator, which, in turn, generates an additional deflection voltage.

Here it is disadvantageous that the generation of the frequency marker by means of the low pass or band pass filters presupposes, especially in case of small frequency sweep ranges, on account of the filter building-up time, an adequately small sweep rate if clearly readable frequency markers are to result. In the case of excessively high sweep rates, in consequence of the bulding-up behavior of the low pass or band pass filters, manifestations which are disadvantageous make themselves noticeable. There arise, for example, in display devices which are adapted to display one frequency marker in the forward and one frequency marker in the return sweep of the electron beam for indicating the same point in the frequency response representation, two frequency markers laterally displaced from one another, which enclose between them the point to be marked. By mean value formation the point to be marked can be determined only approximately. In frequency response representations with frequency markers being produced only during the forward sweep of the electron beam, there arises in an analogous manner a lateral displacement between the frequency marker and the point in the frequency response representation to be marked which is entirely indefinite and cannot be determined even approximately. Besides these phenomena, there occurs, in addition, the drawback that in consequence of the different phase position of the differential frequency voltages in each frequency sweep there can occur a lateral positional change of the frequency marker, so that an accurate reading cannot occur.

If, for example, with a sweep range of 100 Hz., the width of a clearly readable frequency marker is selected at 1% of the range, i.e. at 1 Hz., then the building-up time of an unsteepened filter used there, as reciprocal value of the band width amounts to 1 second. This means, however, that the total sweep range for avoiding the drawbacks mentioned, would have to be run through in at least 100 seconds, which corresponds to a sweep frequency of, at most, 0.005 Hz. If one gets around such extremely low sweep frequency, which practically admits no evaluation by means of a cathode ray oscilloscope, by a method such that wider frequency markers are allowed, then there result, on the one hand, inaccuracies in the marker reading, while, on the other hand, the frequency response is more extensively covered by the frequency markers so that its legibility suffers in consequence.

From the U.S. Patent 3,253,216 a frequency response testing system is known, in which a variable frequency is used which can be swept. On the screen of a cathode ray oscilloscope serving as a display device is a scale which serves for reading the frequency and therewith the abscissa of the frequency response represented on the screen. In order to keep the reading errors to a minimum the variable frequency is connected through various band-rejection filters by switching the system from a measuring position to a calibrate position and conducted to the vertical deflection of the cathode ray oscilloscope so that, via the time basis which is decisive for the frequency curve, a calibrate curve is recorded which shows an incision of the amplitude envelope at the frequency values established by the band-rejection filters. If the incisions do not correspond to the frequency data on the scale of the screen, the variable frequency produced by a generator is adjusted accordingly. However, this has the disadvantage that an exact frequency reading is only possible in the special points of the frequency axis which are marked by the band-rejection filters. However, between these points, no control possibility for the accuracy of the reading is given.

SUMMARY OF THE INVENTION

The disadvantages mentioned in the case of the circuit arrangements described at the outset for the frequency marker generation are avoided according to the present invention in a circuit arrangement for frequency marker generation in a frequency response testing system which employs a measuring device for evaluating a measuring voltage, the frequency of which is continuously variable and, in particular, scanned, constituting periodical frequency sweeps, the measuring voltage defining by its amplitude versus time response the frequency response, and further employing a display device taking the form of a cathode ray oscilloscope and including means for mixing the variable frequency with an adjustable reference frequency, means for filtering out the differential frequency of both frequencies, means for applying the differential frequency voltage to the input of a selective network, the output voltage of which is used to form frequency markers, with the selective network including a high pass filter with a relatively low cutoff frequency, means for displaying a representation of the output voltage versus time simultaneously with a representation of the measuring voltage versus time over a common time base on the screen of the cathode ray oscilloscope, the output voltage representation constituting by an incision of its amplitude envelope a frequency marker which is applicable to the representation of the measuring voltage, the frequency to be marked being readable on a scale which is provided for adjustment of the reference frequency.

In contrast to the system disclosed by Patent No. 3,253,216, the circuit arrangement in accordance with the present invention offers the possibility to assign an exact frequency designation to any arbitrary point of the frequency axis through the representation of the difference frequency voltage. This occurs through a corresponding adjustment of the frequency of the generator creating the reference frequency, on whose adjusting means the specific frequency value can directly be read.

The present invention has among its objects to provide a circuit arrangement for generating frequency markers in a frequency response testing system employing a cathode ray oscilloscope as a display device.

A further object of the invention is to provide a circuit arrangement for frequency marker generation in a frequency response testing system employing a cathode ray oscilloscope as a display device, wherein the differential frequency voltage between the variable frequency and an adjustable reference frequency is fed together with the variable frequency to the same deflection device of the cathode ray oscilloscope.

Still another object of the invention is to provide a circuit arrangement for frequency marker generation in frequency response testing systems employing a cathode ray oscilloscope as a display device, wherein the differential frequency voltage and the measuring voltage are fed each to one of two corresponding deflection devices of a cathode ray oscilloscope with a two-beam system.

A still further object of the invention is to provide a circuit arrangement for frequency marker generation in frequency response testing systems employing a cathode ray oscilloscope as a display device, the electron beam of which is deflected in a television-like manner by means of a line-deflection voltage and a frame-deflection voltage, wherein an amplitude comparator generating impulses for modulating the electron beam in brightness performs an amplitude comparison between the line-deflection voltage and the differential frequency voltage superimposed on an auxiliary direct current voltage.

Still another object of the invention is to provide a circuit arrangement for frequency marker generation in frequency response testing systems wherein a measuring voltage is fed together with the differential frequency voltage superimposed on an auxiliary direct current voltage to the same input of a comparator.

Many other objects and advantages of the circuit arrangement for frequency marker generation in frequency response testing systems will be obvious to those skilled in the art from the disclosure herein given.

Further advantages and features of the circuit arrangement according to the invention are apparent from the following description of two preferred embodiments of the invention represented in the drawing.

BRIEF DESCRIPTION OF THE DRAWINGS

FIG. 1A is a block circuit diagram of a frequency response testing system including a circuit arrangement for frequency marker generation;

FIG. 1B illustrates an alternate connection of the circuit arrangement of FIG. 1A to an oscilloscope; and FIG. 2 is a block circuit diagram of another embodiment of a frequency response testing system including a circuit arrangement for frequency marker generation.

DESCRIPTION OF THE PREFERRED EMBODIMENTS

The details of the invention will now be described in detail referring to FIG. 1A, FIG. 1B, and FIG. 2 of the drawing, wherein like reference numerals are employed to designate the same or similar components.

In FIG. 1A, a frequency response testing system is represented which consists of an oscillator which generates a measuring voltage, the frequency of which is continuously variable and, in particular, scanned, constituting periodical frequency sweeps, and a measuring device, which contains a cathode ray oscilloscope 2 as a display device. In a well known manner, there is represented the frequency response 3 of an interposed test object X on the picture screen of the cathode ray oscilloscope 2 in which process a wobbulating voltage generator 4 feeds to the oscillator 1, for example, a sawtooth wobbulating voltage and varies the frequency of the latter correspondingly, and simultaneously delivers the horizontal time deflection voltage providing the time base for the cathode ray oscilloscope 2. The measuring voltage appearing at the output side of the test object X being rectified by means of a rectifier 12 is employed for the vertical deflection.

For the generation of a frequency marker in the frequency response representation, the measuring voltage fed to the test object X together with a reference voltage, adjustable in frequency, generated by a generator 5, is fed to a mixing device 6 which forms the differential frequency voltage. Over an RC member 7 connected at the output side the combination frequencies resulting, with the exception of the differential frequency voltage, are largely suppressed. The differential frequency voltage is conducted over a high pass filter 8 with a low cutoff frequency and fed to the vertical deflection system of the cathode ray oscilloscope 2. If, now, on the picture screen of the cathode ray oscilloscope 2, the differential frequency voltage versus time response is represented over the time base belonging to frequency response 3, separately from this, then there results a frequency marker curve 9. This consists, in detail, of a sine-form curve whose frequency, on approaching the frequency marker from both sides in each case, goes toward zero, the frequency marker itself corresponding to the differential frequency of zero. Simultaneously, the frequency marker, in consequence of the selectivity of the high pass filter 8 is also marked out by the fact that the amplitude envelope of the frequency marker curve has at this place a sharp identation. Because of the phase jumps taking place in the individual frequency sweeps at the reversing points there arise in each case sine-form curves of the differential frequency voltage which are laterally displaced against one another, so that the frequency marker curve 9 gives the impression of a luminous band. Here, however, it is notable that the indentation and/or incision of the amplitude envelope at the differential frequency zero is always retained with great precision without any lateral displacement on the picture screen. The amplitude of the frequency marker curve 9 or the width of the luminous band is here expediently adjusted by an amplifier 10 with variable degree of amplification.

One possibility for the separate representation of the frequency response 3 and of the frequency marker curve 9 on the screen of cathode ray oscilloscope 2 consists in using a two-beam system in which the measuring voltage and the differential frequency voltage are fed to the particular vertical deflection systems, having input terminals A and B, while the time base, which is formed by the sawtooth voltage of the wobbulating voltage generator 4 is common to both systems. Another possibility consists in feeding the measuring voltage together with the differential frequency voltage to a change-over switch which feeds both voltages alternately to the vertical deflection system of a single-beam oscilloscope. The changeover can here take place in each case between the individual frequency sweeps or also several times within one sweep.

Another possibility for the simultaneous representation of the aforesaid frequency response 3 and a frequency marker curve 9 is indicated at 11 in FIG. 1B. The representation indicated at 11 results when the measuring voltage and the differential frequency voltage are fed together to the same deflection device of a cathode ray oscilloscope, having an input terminal C. Here, the frequency marker curve 9 is directly superimposed on the frequency response representation 3 mentioned above. Here, too, there results an incision of the amplitude envelope which presents a precisely readable frequency marking. Through selection of the degree of amplification of the amplifier 10, the differential frequency voltage can be varied in its amplitude in such a way that, for example, there results a two-, five- or ten-fold enlargement of the line thickness of the frequency response representation, the point in the response to be marked being reduced to the normal line thickness. Through variation of the frequency of the generator 5, the frequency marker formed by the incision of the amplitude envelope is shifted at will over the width of the time base.

The frequency response testing system represented in FIG. 2 differs from the one described above in that another mode of operation is used on the cathode ray oscilloscope 2. Here, the electron beam sweeps the entire picture screen surface in the manner of a television screen in individual lines and is modulated with a bright spot in each case in the individual curve points of the frequency response representation. In order to achieve a deflection of the electron beam in the manner of a television screen, there is fed, for example to the electromagnetic deflection device 13 operating in vertical direction a sawtooth line deflection current 14 and to the horizontally acting electromagnetic deflection device 15 a likewise sawtooth-shaped frame deflection current, which, as is represented in FIG. 2, is preferably delivered by the wobbulating voltage generator 4. Line and frame deflection currents are attuned to one another in the manner known from television engineering, in frequency, in time and in amplitude. The line deflection current 14 is fed through a resistor 23 at which a voltage proportional to the line deflection magnitude results. This voltage is fed to the first inputs of two amplitude comparators 16 and 17 whose second inputs are fed with the measuring voltage delivered from the rectifier 12 and the differential frequency voltage delivered from the amplifier 10, respectively. The differential frequency voltage is superimposed with an auxiliary direct current voltage 18 adjustable in magnitude. In this embodiment of the invention, the frequency of the measuring voltage generated by oscillator 1 is mixed in a mixing device 24 with the frequency of the output voltage of a fixed frequency generator 25, in which operation the differential frequency is filtered out and fed to the test object X.

The amplitude comparator 16 operates in such a manner that on reaching the applied momentary amplitude value of the measuring voltage delivered by the rectifier 12, through the continuously increasing or climbing voltage corresponding to the line deflection magnitude an output impulse 19 is formed, which passes to the modulator electrode 20 and brightens the electron beam precisely when it is pointed on the vertical line concerned, to the place which corresponds to the function value of the frequency response to be presented. The frequency response 3 on the picture screen is composed point by point by the totality of the brightened line points in the individual adjacently situated lines. Additionally, on reaching a determined frequency, it is possible in a known manner per se, to feed a rectangular impulse 21 to the modulator electrode 20, whereby according to the impulse length, a more or less long line portion segment is brightened, which forms a frequency marker 22.

The differential voltage appearing on the output side, of the adjustable amplifier 10, is superimposed on an auxiliary direct current voltage 18, and is fed, in this embodiment of the invention, to the second input of the amplitude comparator 17, which through its output impulses formed at amplitude equality brightens the electron beam additionally in such a way that the image of the differential frequency voltage results in the form of the frequency marker curve 9. It is to be requested here that the line frequency is considerably higher than the difference between the variable frequency and the reference frequency. Here, again also the frequency marker formed at equality of frequency between the variable frequency and the reference frequency, represented by the constriction of the amplitude envelope of the frequency marker curve 9 is readable with great accuracy and without any undesirable lateral displacement. By adjusting the amplitude of the auxiliary direct voltage 18, the frequency marker curve 9 can be shifted vertically and, in particular, can be blended into the frequency response representation 3, in which process simultaneously, through the adjustment of the frequency of the generator 5, a lateral shifting of the frequency marker can be brought about.

If, in the embodiment of the invention represented in FIG. 2, the comparator 17 is omitted, then the output voltage of 18 can be fed, together with the measuring voltage delivered from the rectifier 12, to the same input of comparator 16. Here, there results on the picture screen of cathode ray oscilloscope 2 a super-position of the frequency curve 3 with the frequency marker curve 9, so that there results a representation of the frequency marker curve 11, FIG. 1B.

If a frequency marker, for example indicated with 22 in FIG. 2, is generated by a method which has a low longtime constancy, for example, by means of an amplitude comparison between a voltage depending in its amplitude on the momentary value of the variable frequency with an amplitude adjustable reference voltage, in which at amplitude equality an output impulse generating the frequency marker is formed, then it is possible by using the present invention, to make, by means of the frequency marker curve 9, a calibration or control of the relatively inaccurately generated frequency marker.

The wobbulating voltage generator 4 can also, in line with the present invention, suitably generate, besides the sawtooth voltage described, other wobbulating voltages of any desired curve form, thus, of example, logarithmically distorted sawteeth, triangular voltages, sine-form voltages or the like. Moreover, the high pass filter 8 with low cutoff frequency can be replaced by a band elimination filter with a narrow blocking range. In this case, a frequency marker is generated not at frequency equality between the variable frequency and the reference frequency but on reaching a fixed difference between the two frequencies, said difference being defined by the position of the blocking range of the band elimination filter along the frequency axis. If the frequency to be marked is to be directly readable on an adjusting scale, then it is useful to execute the numbering on the adjusting and/or setting scale of the generator 5.

Changes may be made within the scope and spirit of the appended claims which define what is believed to be new and desired to have protected by Letters Patent.

We claim:

1. In combination with a frequency response testing system which comprises a source of continuously varying frequency, means feeding said varying frequency to a test circuit whereby a measuring voltage will be produced at the output of said circuit, and a display device including a time-base generator for receiving said varying frequency and said measuring voltage, the combination of a circuit arrangement for generating a frequency marker comprising a source of adjustable reference frequency, means for mixing the frequency of said varying frequency with said adjustable frequency, means for filtering out the difference frequency from said mixing means, selective network means having an input connected to an output of said filtering means and responsive to the difference frequency to produce an output voltage having a frequency equal to the difference frequency, means feeding the output voltage of said selective network means to an input of the display device for displaying a representation of the output voltage versus time simultaneously with a representation of the measuring voltage versus time over a common time base on the display device, the representation of the output voltage having a point of substantially different amplitude than the amplitude of remaining portions thereof which forms a frequency marker applicable to the representation of the measuring voltage.

2. A circuit arrangement as defined in claim 1, wherein said selective network means includes a high pass filter with a relatively low cutoff frequency.

3. A circuit arrangement as defined in claim 1, wherein said selective network means includes a band elimination filter with a relatively narrow blocking range.

4. A circuit arrangement as defined in claim 1, wherein the display device includes a two-beam cathode ray tube and wherein said output voltage and the measuring voltage are each connected to a respective deflection device of the display device.

5. A circuit arrangement as defined in claim 1, wherein the display device includes a cathode ray oscilloscope, the electron beam of which is deflected in a television-like manner by means of a line-deflection voltage and a frame-deflection voltage, and further comprising an amplitude comparator generating impulses for modulating said electron beam in brightness, said amplitude comparator performing an amplitude comparison between said line-deflection voltage and said output voltage, the latter being superimposed on an auxiliary direct current voltage.

6. A circuit arrangement as defined in claim 1, wherein the display device includes a cathode ray oscilloscope, the electron beam of which is deflected in a television-like manner by means of a line-deflection voltage and a frame-deflection voltage, and further comprising an amplitude comparator generating impulses for modulating said electron beam in brightness, said amplitude comparator performing an amplitude comparison between said line-deflection voltage and said differential frequency voltage, wherein said measuring voltage is fed together with the output voltage superimposed on an auxiliary direct current voltage to the same input of the comparator.

References Cited

UNITED STATES PATENTS 3,253,216   5/1966   Feldman ............... 324—57

RUDOLPH V. ROLINEC, Primary Examiner.

JOHN W. CALDWELL, Examiner.

R. K. ECKERT, E. E. KUBASIEWICZ,
Assistant Examiners.